Dec. 17, 1935.    B. C. PLACE    2,024,805
FASTENER
Filed Jan. 25, 1932
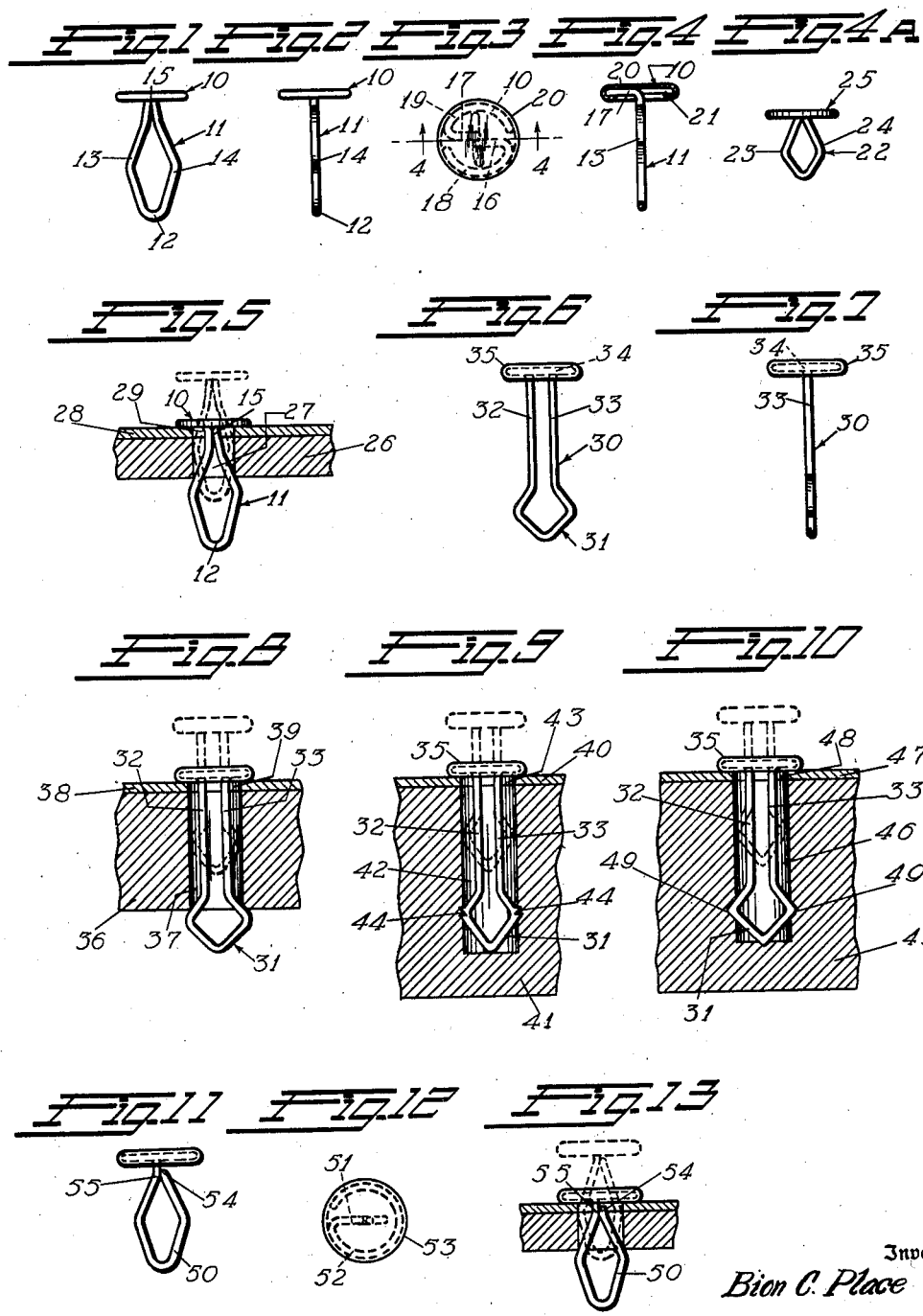
Inventor
*Bion C. Place*
By
*Strauch & Hoffman*
Attorneys Patented Dec. 17, 1935

2,024,805

UNITED STATES PATENT OFFICE 2,024,805

FASTENER

Bion C. Place, Detroit, Mich., assignor of one-half to George E. Gagnier, Detroit, Mich.

Application January 25, 1932, Serial No. 588,697

9 Claims. (Cl. 24—213)

This invention relates to an improved spring stud fastener of the type that includes an expansible and contractible shank that does not completely, or substantially completely, fill the opening or socket, with which the shank engages when the fastener is serving its intended purpose.

More particularly, the invention relates to a spring stud fastener of the kind that is constructed from a single elongated strip of metal, such as flat or round wire, in which a portion of the wire is bent to form the expansible and contractible shank of the fastener, while another portion thereof forms the head, or constitutes the part of the fastener that engages any member held in position by the fastener when it is serving its purpose.

Spring fasteners heretofore proposed of the kind that include an expansible and contractible shank, that does not completely fill the opening, have generally depended for their holding power upon the several arms that constitute the shank of the fastener. Such arms have generally been arranged to diverge from the head so that each of them is capable of independent bending irrespective of the other, so that each arm functions separately from the other. Fasteners of this character are entirely satisfactory when used in situations in which the length of the arms need not be relatively great, that is, in which the point of engagement of the arms with the socket or edge of the wall of the perforation or socket with which the shank is engaged is not so remote from the head of the fastener, that it becomes impractical without ordinary size sockets or openings to provide arms of sufficient divergency to give a sufficiently great holding power.

The primary object of this invention is to provide a fastener that is capable of being put to universal use, irrespective of the required length of the shank of the fastener, and that provides a sufficient holding power irrespective of the length of shank necessary in order that said shank may engage the portion of the socket or aperture with which the fastener should contact to most effectively serve its intended purpose.

A further object of the invention is to provide a spring snap fastener having an expansible and contractible shank in which the necessary contraction of the shank of the fastener, in entering the aperture or socket provided to receive it, is effected by distortion of the shape of the shank of the fastener, and in which the subsequent expansion of the shank of the fastener is the result of the restoration of the shank to substantially its original form.

Still another object of the invention is to provide a spring snap fastener having a shank in the form of a loop connected to the part of the fastener, that engages the member held in position thereby, in such a way that elongation of the loop must result when the fastener is entered into an aperture or socket having a width or diameter that is less than the maximum width of the loop in its normal condition.

Still another object of the invention is to provide a spring snap fastener made of a single piece of metal, a part of which is bent to form the shank of the fastener and another part to form the head thereof, or the part that engages the member held in position by the fastener, in which the shank is substantially in the form of a closed metal loop associated with said head or part in such a way that upon contraction of the shank of the fastener the loop is elongated to reduce it in width, so that the inherent tendency of the closed loop to assume its original position is relied upon to give the fastener a relatively wide degree of expansion when it reaches its operative position with the shank in holding engagement with the socket or aperture of the supporting structure.

A further object of the invention is to provide an arrangement for securing a member in position upon a supporting structure provided with a hole, which arrangement utilizes a fastener having a shank in the form of a loop which may be deformed in entering the fastener in the hole, and that subsequently is positively caused to resume its original form by contacting with the bottom of the hole.

Still another object of the invention is to provide an arrangement for securing members, such as trim panels, to a perforated supporting structure by means of a fastener having a shank consisting solely of a single loop, the sides of which are formed to present outwardly bowed or convex surfaces that are flattened when the shank of the fastener is driven in an aperture of a supporting structure having a diameter or width that is less than the maximum width of the loop of the fastener, which loop assumes substantially its original form after it has been driven completely through said aperture in the supporting structure.

Another object of the invention is to provide a fastener of the spring stud type constructed from a single piece of wire so that one portion of the wire forms the shank of the fastener and the other portion thereof forms the head, and in which a sheet metal cap or the like is utilized to restrict the movement of the portions of the wire constituting the shank of the fastener that are disposed immediately adjacent the head of the fastener.

Still further objects of the invention will appear as a description thereof proceeds with reference to the accompanying drawing, in which:

Figures 1 and 2 are respectively side and edge elevational views of the preferred form of the fastener of the present invention.

Figure 3 is a plan view of the fastener.

Figure 4 is a sectional view taken on the plane indicated by the line 4—4 on Figure 3.

Figure 4a is a side view of a modified form of the fastener.

Figure 5 is a fragmentary sectional view showing a mode of use of the fasteners illustrated in the figures just described.

Figures 6 and 7 are respectively side and edge elevational views of a modified form of fastener provided with a long shank.

Figure 8 is a fragmentary sectional view showing one way of using the fastener illustrated in Figures 6 and 7.

Figure 9 is a fragmentary sectional view showing another way of using a fastener of the type illustrated in Figures 6 and 7.

Figure 10 is a fragmentary sectional view showing still another way of using said fastener.

Figures 11 and 12 are respectively side and plan views of a further modified form of fastener.

Figure 13 is a fragmentary sectional view showing one way of using the modified form of fastener illustrated in Figures 11 and 12.

Like reference characters indicate like parts throughout the several figures.

Referring first to the fastener shown in Figures 1, 2, 3, and 4 of the drawing, said fastener consists of a part 10 designed to engage a member held against a suitable supporting structure. Numeral 11 designates, as a whole, the shank of the fastener, which is intended to enter the hole provided in the supporting structure. Preferably, the fastener is formed of a single piece of relatively stiff spring wire or the like, the piece of wire being bent at 12 to form the nose or entering end of said shank. The portions of the wire adjacent the bend 12 are bowed outwardly as shown at 13 and 14 and are then carried inwardly in contact with each other as shown at 15. The ends of the wire adjacent the point of contact 15 are then bent into a plane disposed substantially at right angles to the length of the shank of the fastener, the portions 16 and 17 thereof, immediately adjacent said bend, being bent away from each other preferably in a substantially straight line. Beyond the portions 16 and 17, the respective ends of the wire are bent approximately in the form of a semi-circle, as indicated at 18 and 19, so that the semi-circular portions 18 and 19 together form a disc-like head. Of course, if the head of the fastener is intended to assume any other configuration than that of a circle, the portions 18 and 19 will be bent as may be necessary.

It will be observed that, since the portions 13 and 14 form a substantially closed loop of elongated form, each side of which may be said to be outwardly bowed with respect to a line extending centrally longitudinally of the shank of the fastener, and since the free ends of said portions 13 and 14 are in contact with each other at 15, that the shank of the fastener cannot be contracted except by flattening the outwardly bowed portions 13 and 14. It will also be observed that, since the fastener is constructed of spring wire, such flattening takes place in opposition to the inherent resilience of the loop, so that, upon release of the pressure on the loop, the shank of the fastener will expand and resume its original form.

When the fastener is to be used in relations in which the head thereof is exposed, preferably, the portions 16, 17, 18 and 19, constituting the wire part of said head is covered or concealed by a metallic cap 20, originally in the form of a cup that fits snugly around the semi-circular portions 18 and 19 and that is subsequently fixed with respect to the wire portion of the fastener by crimping or bending the edges of the cup around the portions 18 and 19, as indicated at 21, Figure 4. When the head of the fastener is not exposed to view the sheet metal cap 20 may be omitted, if desired, since in this form of the invention it serves no other function than as a cap presenting a finished appearance to the head of the fastener.

If desired, the shank of the fastener may be made in the form illustrated in Figure 4a, in which the loop shaped shank 22 is constructed so that it is diamond shaped, rather than oval or substantially oval in side elevation. The fastener of this figure is constructed in the same manner as that just described, with the exception that the outwardly bowed portions 23 and 24 are formed by bending the wire at relatively sharp angles, rather than on curves, as in the form of the invention just described. The head 25 of the fastener of this figure may include a sheet metal cap, or such cap may be omitted in accordance with the above stated considerations respecting the cap 20.

A preferred way of using the fastener just described is illustrated in Figure 5 of the drawing, in which reference character 26 designates a suitable supporting structure provided with a perforation 27 extending completely therethrough. Disposed on this supporting structure 26 is a member 28 that is intended to be secured thereto by means of the spring fastener of the present invention. This member may be an automobile or similar trim panel or the like. Member 28 is provided with an opening 29 that is approximately, or exactly, in alinement with perforation 27 in supporting structure 26. Member 28 is secured to supporting structure 26 by passing the shank 11 of the fastener before described, through the opening 29 and perforation 27. A fastener is selected having a shank that has an over-all maximum width that substantially exceeds the width of the perforation 27 in the supporting structure. When the shank of such a fastener is forced into such perforation by the application of pressure to the head, the divergently disposed portions, adjacent the bend 12 at the end of the shank of the fastener engage the corners or sides of the opening 29, and serve to wedge the same toward each other as the fastener is moved therethrough to thus contract the shank by elongating or lengthening the axis of the loop constituting the same, as illustrated in dotted lines in Figure 5 of the drawing. After the shank has been elongated to reduce the over-all width of the shank thereof, it may be passed completely through the opening 29 and perforation 27, until the head thereof bears upon the outer surface of the member 28 when the fastener is in its operative or holding position.

In this position the widest portion of the shank of the fastener is disposed beyond the corner of the perforation 27 in the supporting structure 26, that is most remote from the member 28, and in this position, the shank of the fastener is free to expand and resume substantially its original form, with the convergently disposed portions between the head of the fastener and the point of its greatest width in contact with said corner or corners of the perforation 27 of the supporting structure 26. Inasmuch as the loop is constructed of spring wire which has a strong tendency to assume its original form, it will be understood that the fastener in its operative position exerts a very strong force against the corner of the perforation 27 with which it engages, holding the fastener firmly in position within said perforation. In view of the relative inclination of the sides of the loop that engage the corner or wall of the perforation 27, the fastener is effective to draw the member 28 towards the supporting structure by yielding wedging action.

The portions of the shank of the fastener between the bend 12, and the point of maximum width thereof, serve to resiliently connect the portions of the fastener that contact with the said edges of the supporting structure so that relatively great resistance to the withdrawal of the fastener irrespective of the length of the shank is thus caused.

The fastener of Figure 4a is used in the same manner as just described. Said fastener, which is provided with a shorter shank and having a loop the sides of which diverge rather sharply from the heads of the fastener, is intended particularly for use in securing members to a supporting structure of relatively small thickness, such as a metallic plate or the flange or web of a metallic supporting frame element. In view of the larger angle between the holding portions of the shank a correspondingly greater holding power is an inherent characteristic of fasteners of this form.

When the perforation or hole in the supporting structure, in which the shank of the fastener is to be inserted is relatively deep, as when the supporting structure consists in a wooden member of relatively great thickness, the fastener illustrated in Figures 6 and 7 is preferred. As illustrated in these figures, the shank 30 of the fastener is formed from the mid-portion of a single strip of wire or metal, by bending the wire so as to provide an oval, or substantially diamond shaped end 31 carried by, preferably straight, parallelly disposed portions 32 and 33 that connect said diamond shaped or oval end of the shank with the head 34 of the fastener. The head 34 is preferably formed by bending the ends of the wire into a plane disposed substantially at right angles to the shank in the manner illustrated best in Figure 2 of the drawing, and by covering the wire head portion of the fastener with a sheet metallic cap 35 applied to the wire head in the manner above described.

One way of using the fastener just described is illustrated in Figure 8 of the drawing in which the numeral 36 designates a supporting structure of relatively great thickness provided with a bore 37 extending completely therethrough. 38 designates a member, which may be a trim panel or finishing strip of an automobile body disposed in lapped relation on the supporting structure 36, and provided with an opening 39 that is exactly or approximately alined with the bore 37 in the supporting structure. Member 38 is secured to the supporting structure by passing the shank of the fastener through the opening 39 and bore 37. Inasmuch as a fastener is selected having a shank constructed so as to have a dimension, measured across its point of maximum width, that is substantially greater than the diameter of the opening 39 and the bore 37, the fastener is inserted by forcing or driving the shank thereof through the opening 39 and bore 37. The engagement of the divergently disposed surfaces of the enlarged end of the shank of the fastener with the corners of the opening in which the fastener is forced or driven causes the enlarged end of diamond or oval shape to be elongated axially of the shank of the fastener against the inherent resilience of the spring metal of which the fastener is constructed, so that the fastener will assume the form illustrated in dotted lines in Figure 8, while it is being driven to its operative position. When the fastener reaches such position it is related to the supporting structure as illustrated in full lines in the same figure, the enlarged end of the shank of the fastener assuming its original form, or approximately such form, thus firmly holding the member 38 to the supporting structure 36 in the manner above described with reference to Figure 5.

The fastener of Figures 6 and 7 may likewise be utilized to secure a member 40 to a supporting structure 41 in the manner illustrated in Figure 9 of the drawing. To this end the supporting structure 41 is provided with a hole 42 that does not extend completely through the supporting structure, and the member secured by the fastener is provided with opening 43 that is approximately in alignment with the hole 42. The fastener in this form of the invention is constructed with a shank of insufficient length so that the tip thereof does not reach the bottom of the hole 42 in the supporting structure.

In securing the member 40 to the supporting structure 41 the fastener is driven through the aligned opening in the member and the hole in the supporting structure causing an elongation of the enlarged portion of the end of the shank of the fastener. Inasmuch as such elongation is resisted by the inherent resilience of the metal it will be understood that the fasteners have continuously effective tendency to resume the original form, whereby the widened portion of the shank frictionally contacts with the wall of the hole 42. When the supporting structure is made of soft wood the fastener will bite thereinto thus increasing the holding power of the fastener in the hole 42. If desired, the portions of the enlarged end of the shank of the fastener which contact with the wall of said hole may be provided with suitably formed teeth 44 that resist the withdrawal of the fastener in a reverse direction, while permitting the fastener to be freely driven into its operative position, or this portion, at the point of maximum width of the enlarged portion of the shank of the fastener, may simply be roughened for the same purpose.

In order that the fastener may be positively caused to bite into the side walls of the hole in the supporting structure the arrangement of Figure 10 may be employed in which the supporting structure 45 is provided with a hole 46 which does not extend completely therethrough. Covering member 47 laps the supporting structure and is provided with an opening 48 through which the fastener is driven into the hole 46. When this mode of use of the fastener is employed, a fastener is selected having a shank, the over-all length of which exceeds the distance of the outer surface of the covering member 37 slightly so that when the fastener is driven completely to operative position the tip of the shank engages the bottom of the hole 46. When the fastener is driven into the supporting structure 45 the shank is initially elongated in the manner before described, and when the tip of the shank contacts with the bottom of the hole a force is exerted to supplement the natural tendency of the fastener to resume its original position, which force is effective to cause the fastener to expand and bite into the wall of the hole 46 as indicated at 49 of the drawing.

It will be understood that irrespective of the mode in which the fastener of the Figures 6 and 7 is used, the holding power of the fastener is derived by an elongation of the shank of the fastener and subsequent contraction thereof, and that the legs 32 and 33 of the shank of the fastener, that carry said enlarged portions, are incapable of freely approaching each other by virtue of the fact that the sheet metal cap 35 is crimped around the wire of the head so as to hold the straight portions of the shank of the fastener from movement toward and from each other. Because of this arrangement a fastener having a stiff enlarged end is provided giving an entirely satisfactory holding power irrespective of the length of the legs 32 and 33 which carry such enlarged portions.

If desired, the fastener illustrated in Figures 1, 2 and 4 of the drawing may be constructed in the manner illustrated in Figures 11 and 12 in which one end of the wire is bent into the form of a loop 50 and the other end of the wire is bent at right angles to the plane of the loop 50 as indicated at 51 and is then bent into substantially circular form as indicated in Figure 3, the portions 51 and 52 constituting the frame of the head of the fastener of this type. A sheet metal cap 53 conceals the wire head of the fastener, said cap being applied to said head by crimping the margins thereof around the circular portions thereof.

In use the fastener of Figures 11 and 12 is applied in a manner similar to that of Figures 1 to 4, inclusive. It will be observed that the tip 54 of the end portion of the wire forming the shank of the fastener bears against the portion 55 so that an enclosed loop of elongated form is provided. The fastener functions similarly to those previously described and it is believed requires no further description.

The invention may be embodied in other specific forms without departing from the spirit or essential characteristics thereof. The present embodiment is therefore to be considered in all respects as illustrative and not restrictive, the scope of the invention being defined by the appended claims rather than the foregoing description, and all changes which come within the meaning and range of equivalency of the claims are therefore intended to be embraced therein.

What is claimed and desired to be secured by United States Letters Patent is:

1. A spring stud fastener constructed of relatively stiff material, consisting of a part that engages material to be held in position on a supporting structure, and a shank constructed of resilient material having an end in the form of a diamond shaped loop connected to said part by relatively long straight portions that are laterally spaced and connected adjacent to and extending from an apex of the diamond at one end and fixedly to said part at the other end so that the loop is contracted by flattening of the diamond when entered in a perforation in the supporting structure having a width less than the maximum width of said shank and which diamond resumes approximately its original form upon expansion when in holding position.

2. A spring stud fastener comprising a head designed to bear upon material held in place by the fastener and an expansible and contractible shank consisting of a part of a single piece of wire return-bent to form the shank, the ends of the wire being bent into semi-circular shape from approximately the same center to form the head, the return-bent portions of the wire constituting the shank being disposed into abutting relation adjacent the head of the fastener and being outwardly bowed to a substantial degree and so as to form relatively sharp angles each with respect to the other at points more remote from said head, whereby upon entry of the shank of the fastener in an aperture in a supporting structure having a diameter less than the maximum width of said shank measured across said outwardly bowed portions the shank is temporarily contracted by flattening said bowed portions which subsequently expand to hold the fastener in holding position.

3. A spring stud fastener having a shank constructed from a portion of a single piece of wire and consisting of a relatively long straight portion and an end in the form of a diamond-shaped loop, and having a disc-like head formed from both ends of said piece of wire and a cap for said head encasing said ends.

4. A spring stud fastener constructed of relatively stiff resilient narrow material and complete in itself, consisting of a disc-like head and a shank projecting away from said head, said shank including a substantially diamond-shaped loop carried by two spaced parallel legs, the sides of said loop presenting relatively sharp angles at the point of maximum width of the shank, and means to prevent movement of said legs adjacent the head of the fastener.

5. A spring stud fastener having a head part formed by bending the ends of a piece of wire in the same plane together to form a substantially closed symmetrical figure and a shank consisting of a pair of legs carrying a diamond-shaped loop formed from the mid-portion of said wire, said legs extending in a plane normal to said part and being bodily immovable adjacent said head part so that the shank can be contracted only by flattening said loop.

6. A spring stud fastener constructed of relatively stiff material comprising a head and an expansible and contractible shank consisting of two spaced legs and a holding part in the form of a metallic approximately closed loop of diamond shaped form arranged so as to present portions that are bowed outwardly with respect to a line extending centrally lengthwise of the shank to present inclined holding shoulders, and means forming a part of said head and engaging said legs to hold said legs immovable adjacent said head so that when the shank enters an aperture of a smaller diameter than the maximum width of said shank the latter is caused to contract by elongation of said approximately closed form.

7. A spring stud fastener consisting of a disc-like head and a shank, said head including the ends of a piece of metal, said ends being each shaped into semi-circular form in outline on substantially the same radius and from substantially the same center, said shank comprising only two legs connected together at the end of the shank and formed from the mid-portion of said piece of metal and including respectively holding surfaces that diverge from the head toward the end of the shank and guiding surfaces that then converge in the same direction and means to prevent movement of said legs in the plane of said head.

8. A spring stud fastener constructed from a single piece of resilient metal, comprising a shank formed from the mid-portion of said piece of metal and having only two outwardly bowed legs that are integrally connected together at the end of the shank, and a flat disc-like head formed from the ends of said piece of metal and consisting of two sections carried by said two legs respectively, said fastener including means to prevent relative movement of said sections and the legs attached thereto in the plane of the head of the fastener whereby contraction of the shank can be obtained solely by a temporary flattening of said outwardly bowed legs.

9. A spring stud fastener constructed from a single piece of resilient metal, comprising a shank formed from the mid-portion of said piece of metal and having only two outwardly bowed legs that are integrally connected together at the end of the shank, and a flat disc-like head formed from the ends of said piece of metal and consisting of two sections, each of which forms one-half of a substantially closed geometrical figure in outline, said sections being carried by said two legs respectively, said fastener including means to prevent relative movement of said sections and the legs attached thereto in the plane of the head of the fastener whereby contraction of the shank can be obtained solely by a temporary flattening of said outwardly bowed legs.

BION C. PLACE.